UNITED STATES PATENT OFFICE.

CHARLES M. HIGGINS, OF BROOKLYN, NEW YORK.

ADHESIVE COMPOUND.

SPECIFICATION forming part of Letters Patent No. 466,239, dated December 29, 1891.

Application filed May 19, 1891. Serial No. 393,315. (No specimens.)

*To all whom it may concern:*

Be it known that I, CHARLES M. HIGGINS, a citizen of the United States, residing at Brooklyn, in the county of Kings and State of New York, have invented certain new and useful Improvements in Adhesive Compounds, of which the following is a specification.

I form my adhesive compound of water, borax, and dextrine dissolved together, and to these afterward add ammonia or other alkali, as hereinafter set forth. The water is preferably heated to boiling, or nearly so, the borax then added and dissolved, and the dextrine is then introduced and stirred in and the heat continued until a perfect solution is obtained. The borax combines chemically with the dextrine and causes it to dissolve more perfectly and remain in solution afterward without separating or precipitating, as generally happens to a great extent with all ordinary solutions of dextrine in water. In addition to this, the borax prevents fermentation and decay and retards, but does not absolutely prevent, molding. When the solution of borax, dextrine, and water is effected as described, and preferably after the solution has cooled to the temperature of the air, I add a small quantity of some alkaline solution, preferably caustic soda or ammonia, and stir the same thoroughly into the solution. This addition produces a peculiar reaction, having the effect to suddenly thicken or partly coagulate or jellify the solution in a remarkable degree, and thus greatly increase the body and viscosity of the mucilage and enhances its adhesive qualities in an extraordinary manner. The alkali, particularly if ammonia is used, also acts to entirely prevent mold or decay, which would not be effected by the borax alone, even if used in a saturating proportion. The peculiar reaction named is usually accompanied by a sudden and positive rise in the temperature of the solution, usually amounting to six or more degrees, indicating an energetic chemical action in the mixture. The thickening effect due to the alkali is practically permanent and disappears only very gradually after a long period of time. In fact, so far as I have observed, it never disappears altogether, but its gradual reduction produces an important and unique advantage, for when the mucilage is exposed for use in the stand it practically remains at the same degree of viscosity, notwithstanding the thickening effect due to evaporation, for the reason that the loss of body due to the gradual reduction of the viscous property named is almost balanced by the increase in body or density due to evaporation, so that this novel mucilage will remain a very long time at more nearly a uniform thickness when exposed to evaporation than any other adhesive compound of which I am aware.

The proportions of the ingredients may vary a good deal, according to the density and viscosity of the mixture required and according to its particular uses. The best proportions for an ordinary strong mucilage are dextrine and water, in equal parts, and borax one-eighth of the dextrine. These parts are by weight, and to the liquid mucilage thus made one-sixteenth to one forty-eighth in volume of ammonia at 20° Baumé or caustic-soda lye at 40° by the same scale should be used to produce the increased viscosity and adhesiveness named. Of course when the alkalies are weaker more may be used, and less when they are stronger. The borax, however, may vary from one-sixteenth to one-fourth of the weight of the dextrine, and the alkali may vary from one sixty-fourth or less to one-twelfth or more of the volume of the mucilage, and the water can vary according to the density of the mucilage required, as will be understood.

The viscous effect described cannot be obtained if caustic alkalies are used in combining with the dextrine instead of the borax; but it can be obtained when boracic acid is substituted for the borax, so that a boron compound or some equivalent thereof is an important element of my invention. The carbonate or bicarbonate of soda will not give the effect of the biborate of soda; but it is probable that some other mild salt analogous to borates or the biborates or some other acid analogous to the boracic may be found to act as an equivalent.

Other coagulating or thickening agents may be used besides the caustic alkalies. The alkaline salts and alum may be so used. Most of the alkaline salts, however—such, for instance, as the carbonate of soda—have only a slight thickening effect when added to the compound of dextrine and borax. Alum, however, when used with the alkalies increases the coagulating or thickening effect very materially. A saturated aqueous solution of alum may be used for this purpose, preferably in a volume about equal to the volume of the alkaline solution used; but this proportion may vary. The alum is preferably added first to the solution of borax and dextrine and the alkali afterward added, when a strong thickening effect takes place, the mucilage becoming extremely viscous and adhesive. The alkaline solution may, however, be added before the alum solution; but the effect is not so good.

If a solution of dextrine and caustic alkali be first made and borax afterward added thereto, no thickening effect is produced, whereas if the borax is first combined with the dextrine and caustic alkali afterward added a positive thickening effect is obtained.

The mucilage herein described may of course be dried into a solid granular gum, which may be dissolved in water as required.

In some cases the dextrine and borax may be combined together in proper proportions in the form of dry powders, which can afterward be dissolved in hot water, and to the solution thus formed a little ammonia or other alkali may be added, which will form a very viscous and adhesive mucilage in a very simple and ready manner and at a very slight cost.

I am aware that a composition has heretofore been shown in the United States Patent No. 244,200, of 1881, consisting of ninety-two per cent. dextrine with three per cent. borax and five per cent. alum, the whole being dissolved in cold water. This composition is quite distinct from my composition of dextrine, borax, and water, as it is essential to my composition that the borax be in a large proportion relatively to the dextrine, such as about from one-sixteenth to one-fourth of its weight, and that the mixture be heated or boiled, as set forth, in order to effect a chemical combination of the borax and the dextrine. Where the borax exists in only a small proportion, as in the patent referred to, and where no heat is applied to the mixture, only an imperfect murky solution and combination of the borax and dextrine with the water is effected, and a large part of the dextrine will eventually precipitate in a sedimentary or flocculent form. On the contrary, where the proportion of borax is relatively large and where the two are combined with the water by heat or boiling, as in my invention, a perfectly clear and permanent solution of the dextrine in the water is effected, which will not afterward precipitate or deposit, as is the case with almost all solutions of dextrine usually made.

The limiting heat or temperature at which the chemical combination of the dextrine and borax takes place seems to be about 90° Fahrenheit, for if the solution is made several degrees below that the combination does not seem to take place. The most perfect combination and solution seem to be effected at a temperature between 150° and the boiling-point, which is the range within which I prefer to work. Where, however, an alkali is added to the compound of borax and dextrine, a high temperature does not seem to be essential—that is, the addition of an alkali seems to promote the combination of the borax with the dextrine, so that this will take place at a lower temperature. Hence a comparatively clear and viscous solution of the dextrine and borax may be made cold, or nearly so, when the alkali is afterward added to the compound; but a much clearer solution and a much stronger thickening effect are produced if the borax and dextrine solution is made at a temperature of 90° or more and the alkali afterward added.

Of course the thickening or coagulating agents can be added to the mucilage in powder instead of solution; but the solution is obviously preferable.

Either the white or yellow dextrines may be used to good advantage in this compound, the white dextrine making a much more viscous compound than the yellow dextrines. Glucose or grape-sugar will combine and act in almost exactly the same manner as the dextrines, and may be considered the equivalent or substitute therefor in this compound; but the sugars will not make a good adhesive compound as compared with the dextrines. Mucilage made as described herein with one of the sugars in place of the dextrines will be very inferior in cementing power and quite hygroscopic, whereas the mucilage made as described with dextrine is a very quick drier and not affected by atmospheric moisture.

I wish it to be understood that where I name borax in the claims I mean, of course, to include the boracic acid or its equivalent, as set forth in the specification, as being the equivalent of the borax.

What I claim as my invention is—

1. An adhesive compound formed of water, dextrine, and borax in the proportions specified, and combined by heat or boiling, substantially as herein set forth.

2. An adhesive compound composed of water, borax, dextrine, and a thickening or coagulating agent, substantially as herein set forth.

3. A viscous adhesive compound formed of dextrine and borax dissolved in water, with an alkali added thereto, substantially as set forth.

CHAS. M. HIGGINS.

Witnesses:
JNO. E. GAVIN,
P. FRANCIS KELLY.